US010496146B2

(12) United States Patent
Neale, IV (10) Patent No.: US 10,496,146 B2
(45) Date of Patent: Dec. 3, 2019

(54) DIGITAL, POWER AND RECHARGING, EXTENSIBLE AND SCALABLE LOCAL CLOUD UNIT V2.0

(71) Applicant: Carter Christopher Neale, IV, Granbury, TX (US)

(72) Inventor: Carter Christopher Neale, IV, Granbury, TX (US)

( * ) Notice: Subject to any disclaimer, the term of this patent is extended or adjusted under 35 U.S.C. 154(b) by 381 days.

(21) Appl. No.: 15/426,818

(22) Filed: Feb. 7, 2017

(65) Prior Publication Data

US 2017/0269661 A1 Sep. 21, 2017

Related U.S. Application Data

(60) Provisional application No. 62/292,456, filed on Feb. 8, 2016.

(51) Int. Cl.
| | |
|---|---|
| G06F 1/26 | (2006.01) |
| G06F 1/16 | (2006.01) |
| G06F 13/40 | (2006.01) |
| H01R 25/00 | (2006.01) |

(52) U.S. Cl.
CPC ............ *G06F 1/266* (2013.01); *G06F 1/1632* (2013.01); *G06F 13/4081* (2013.01); *H01R 25/006* (2013.01)

(58) Field of Classification Search
CPC .... G06F 1/266; G06F 1/1632; G06F 13/4081; H01R 25/006
See application file for complete search history.

(56) References Cited

U.S. PATENT DOCUMENTS

| | | | | |
|---|---|---|---|---|
| 7,025,627 | B2* | 4/2006 | Rosenthal | H01R 13/72 439/142 |
| 7,315,444 | B2* | 1/2008 | Chen | H01R 13/74 361/679.55 |
| 7,503,808 | B1* | 3/2009 | O'Shea | H01R 31/065 439/639 |
| 9,442,526 | B2* | 9/2016 | Rosenberg | G06F 1/1632 |
| 9,965,007 | B2* | 5/2018 | Amelio | H01R 24/78 |
| 2003/0035471 | A1* | 2/2003 | Pitsoulakis | H04M 11/062 375/222 |
| 2006/0061964 | A1* | 3/2006 | Cheng | G06F 1/1632 361/679.41 |
| 2007/0174532 | A1* | 7/2007 | Chen | G06F 1/266 710/313 |

(Continued)

*Primary Examiner* — Michael C Zarroli

(57) ABSTRACT

A digital device containing the port types: power I/O, computer accessory & peripheral I/O, telephony, router, switch, network, antenna, UPS, surge protectors and lockable storage for user storage drives. Power I/O ports allow for separate power control of: an external computer, UPS and monitors; accessories and non-computer peripheral units; network router and switch, internal/external storage drives and device chargers. Operating apparatus consists of plugging into AC power from wall and peripheral devices to apparatus by way of cable harness; turning the apparatus on/off by way of front power buttons for external computer power, peripheral power and network power. Storage of user placed storage drives inside apparatus occurs by opening lid, connecting storage drives inside device and closing lid. Locking device occurs by way of two locks: one secures lid to device; one secures device to desktop.

10 Claims, 7 Drawing Sheets

Front Upper Left Corner View

Back Upper Left Corner View (56) References Cited

U.S. PATENT DOCUMENTS

| | | | | |
|---|---|---|---|---|
| 2008/0012423 A1* | 1/2008 | Mimran | ............... | H01R 25/003 |
| | | | | 307/11 |
| 2015/0193372 A1* | 7/2015 | Norair | .................... | H01Q 1/084 |
| | | | | 710/63 |
| 2016/0224064 A1* | 8/2016 | Fleisig | .................. | G06F 1/1632 |
| 2017/0048278 A1* | 2/2017 | Tomasso | ............. | H04L 12/4633 |
| 2017/0192928 A1* | 7/2017 | Arnouse | ............. | G06F 13/4081 |

* cited by examiner

FIG. 1 - Head on view of Front of device:

FIG. 2 - Head on view of Left Side of device:

FIG. 3 - Head on view of Right Side of device:

FIG. 4 – Head on view of Back Side of device:

FIG. 5 - Head on view of Interior of Back Side of device:

FIG. 6 – Front Upper Left Corner View

FIG. 7 – Front Upper Right Corner View

FIG. 8 – Back Upper Left Corner View

FIG. 9 – Back Upper Right Corner View

FIG. 10 – Head on view of Interior of Right side of device:

FIG. 11 – Front Upper Left Corner View Inside

FIG. 12 – Front Upper Right Corner View Inside

FIG. 13 – Wire harness to connect from computer to device

FIG. 14 – Power cord for device to wall

FIG. 15 – Peering into the open device from the Front Left

DIGITAL, POWER AND RECHARGING, EXTENSIBLE AND SCALABLE LOCAL CLOUD UNIT V2.0

CROSS-REFERENCE TO RELATED APPLICATIONS

None

STATEMENT REGARDING FEDERALLY SPONSORED RESEARCH OR DEVELOPMENT

There was no Federally Sponsored Research or Development involved at any stage of this.

SEQUENCE LISTING

Non-applicable

BACKGROUND OF THE INVENTION

This application for the invention is related to Digital Devices. I know of no other device or design that does what this device does. I came up with this device because I was unable to find anything that would do what this device does. I needed something that would make it easier for people with motor disabilities to access their computer, placing everything within easier reach, allows for more simplified control of the desktop/workspace and provides more finely controlled power control of devices.

BRIEF SUMMARY OF THE INVENTION

This device allows all cables for any computer to be brought under control in a safe manner, extends and places all computer ports on a work-surface within finger's reach, clears items off the work-surface so that more work-surface real estate is recovered, places all power control at user's fingertips, requires no software or operating system (OS), can hold a modem/router, NAS drives, external/peripheral drives, provides ports for charging/recharging tablets/phones/multimedia players/laptops/netbooks.

DETAILED DESCRIPTION OF THE INVENTION

This device can be connected to a computer and to the wall by way of a wire harness/bundle that is plugged into the computer and then into the back of the device and to the wall for power respectively. The harness/bundle keeps all of the cables needed under control and out of the way. The wire harness/bundle could be refitted to allow for different combinations of connections. This device centralizes user control of all accessory devices, the computer and any other desktop items while allowing the computer to be placed in an "inconvenient" location such as under a desktop or in a cabinet. The cable harness length can be in whatever length the manufacturer offers relative to any limitations of the device's/accessory's maximum cable length restrictions.

This device makes available at desktop/workspace level all ports from a computer regardless of whether it is a Windows computer, Apple computer, Linux or any other OS computer, laptop, mini-pc, micro-pc, all-in-one, netbook or any computer platform or derivative. This device can be placed at any level and desktop/workspace level should not be construed to be specifically on a desktop but that the device can be placed wherever it is most convenient for the user and that space allows.

This device makes available at desktop/workspace level numerous auxiliary power ports for various desktop/workspace items requiring power (ie., lamps, calculators, adding machines, speakers, monitors, etc.).

Figure 1:
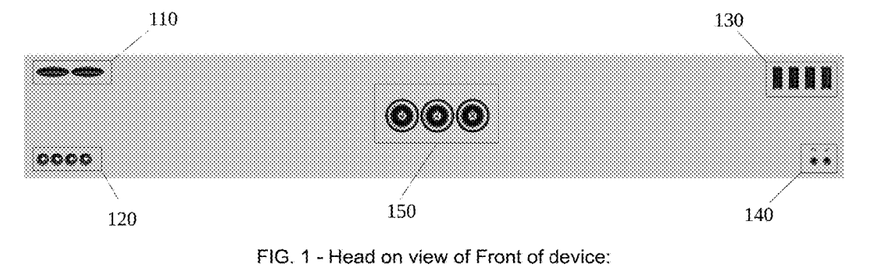
FIG. 1—Head on view of Front of device
FIG. 2—Head on view of Left Side of device
FIG. 3—Head on view of Right Side of device
FIG. 4—Head on view of Back Side of device
FIG. 5—Head on view of Interior of Back Side of device
FIG. 6—Front Upper Left Corner View
FIG. 7—Front Upper Right Corner View
FIG. 8—Back Upper Left Corner View
FIG. 9—Back Upper Right Corner View
FIG. 10—Head on view of Interior of Right side of device
FIG. 11—Front Upper Left Corner View Inside
FIG. 12—Front Upper Right Corner View Inside
FIG. 13—Wire harness to connect from computer to device
FIG. 14—Power cord for device to wall
FIG. 15—Peering into the open device from the Front Left

This device makes available full power control over all devices attached to it and allows for various independent power configurations by way of the example center three power buttons on the front face (device power, computer power, cloud power). More or less buttons can be used and the three used here should not be interpreted as the device being required to have any more or less power buttons than what the manufacturer wishes. This device's example power buttons allow the user to turn off any or all of the device(s) without having to resort to multiple locations to turn power on or off for any items connected to it. A surge protector and/or a power conditioner and/or an uninterruptible power supply may be integrated at manufacturer's discretion.

This device saves room on the desktop/workspace by it's ability to hold in it's interior a modem, router, switch and/or other networking device(s) as well as multiple internal or external hard drives, thumb drives, desktop drives, jump drives or portable drives. The drives and networking devices mentioned in this should not be construed to limit the type or number of drives or networking devices able to be installed nor should the amount of ports internally shown here be construed as a limit or recommended amount of ports or of which type. This device could also be constructed in such a way as to allow for various types of hard drives, optical or otherwise types of drives to be permanently installed internally or in a hot-swappable configuration as well as simply being placed inside by a user.

This device can be equipped with one or more locks. A KSS lock to protect the device itself and contents from theft and a standard lock to protect any devices placed on the inside of the device from theft. Locks of other types may or may not be used and differing numbers of locks can be used as well or not at all.

This device keeps internal wires and cables in a neat appearance for the user for ease of connecting accessories. All ports on the backside in the central input area forward on either to ports on the inside of the device for accessories placed internally or they forward on to the various external ports placed around the device on the various sides. The cables and wires of this device may be hidden or not internally or externally and the cables and wires may be organized or not internally or externally.

This device splits some port extensions for ease of use. So, one USB port from the computer may forward to the left side USB ports for example. One port from the computer may forward to multiple ports of it's respective type while another port from the computer may only forward on to one single port. This device is backwards compatible with many previous technologies such as USB1, USB2 and USB3. The ports mentioned here should not be interpreted as a limit to type or compatibility. Many ports may be selected for use or not at all. The ports and slots in and on this device are merely shown as examples and not to be intended to represent a minimum or maximum amount of any ports or any type of ports that can be manufactured or designed.

A button, lever, release or tension springs could be used to keep the device's top closed.

The presence of a cooling fan(s) or cooling slot(s) could be added or not and should not be interpreted as missing or included.

Small feet can be added to the bottom of the device. The feet could be made from multiple materials and should not be construed to be of any particular type or style or included or otherwise.

This device can be manufactured from a number of materials such as (but not limited to) aluminum, steel, plastic, wood.

This device can be manufactured with a number of different finishes such as (but not limited to) carbon-fibre, mahogany, plastic, stainless.

The device can use multiple types of hinges for the top's movement as well as multiple types of hinges could be used to move or manipulate any side or facing. This device is shown with the Top opening. This device can be built with any or all faces opening or closing with multiple types of hinges and/or fasteners and or lids or opening and closing sides.

This device can use many ports, connectors and fasteners for connectivity either internally or externally. No number of displayed ports, connectors or fasteners shown on this should be construed or interpreted as the only ones available or recommended. The appropriate amounts of ports, connectors or fasteners are the appropriate amount that accomplishes the required or desired tasks.

All buttons, switches or knobs, for power or otherwise; all connections, ports, power, data, video, audio, antenna or otherwise; all locks K-type or otherwise are forwarded or connected to their respective endpoints which is kept out of the way from the end-user/consumer who will access the connection from the external sides of the device unless the end-user is using connections on the inside of the device as well as the outside.

The interior connectors may or may not be covered, hidden or obscured in some way and may lie exposed or not.

This device measures Twenty inches (20") wide by Ten inches (10") deep by Three inches (3") tall. 20"×10"×3". In no way should the above measurements be taken to mean that they are the only size that the device can be. The device can be made to any size that accomplishes and retains the functionality of the device.

Operation:

To use this device, turn on the appropriate part of it or all of it at the power buttons on (FIG. 1) Computer Power, Cloud Power and or Device Power. Device power will provide power to the device while cloud power would then engage the network/router/switch/modem if present as well as the supplemental drives plugged into it and the computer power switch will power on and off the computer attached to the device if any.

Figure 2:
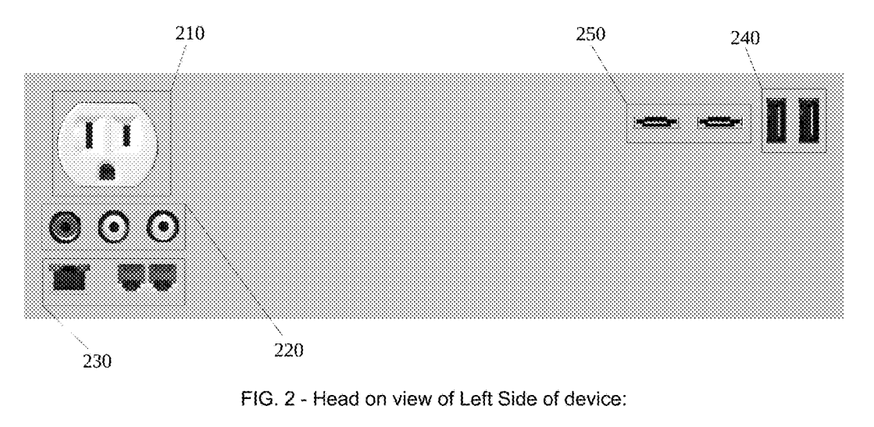
Figure 3:
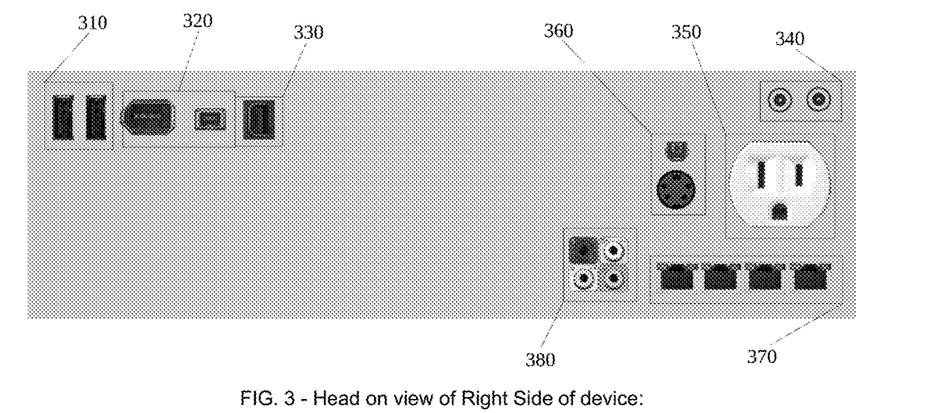

External items may be plugged in at the user(s) choice into the appropriate ports/plugs as seen in (FIG. 1, FIG. 2 and FIG. 3). Items are only limited by ports.

Figure 4:
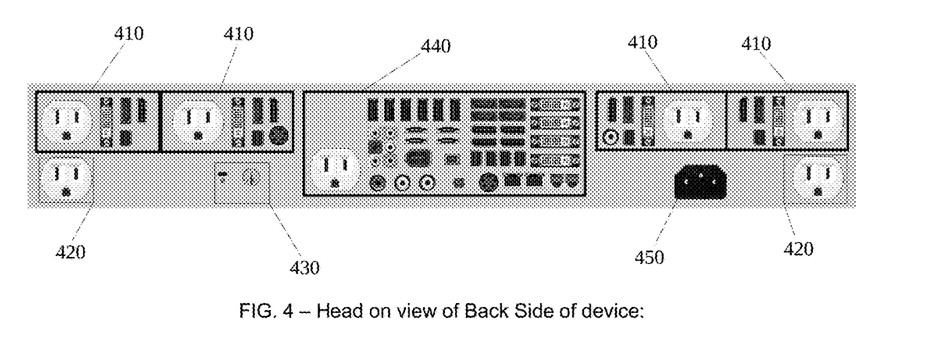

(FIG. 4) shows the main input/output ports/connectors from the computer as well as the power plug for the unit to the wall and output ports for monitors and other video equipment as well as power outlets. There are also two locks displayed in (FIG. 4).

Figure 5:
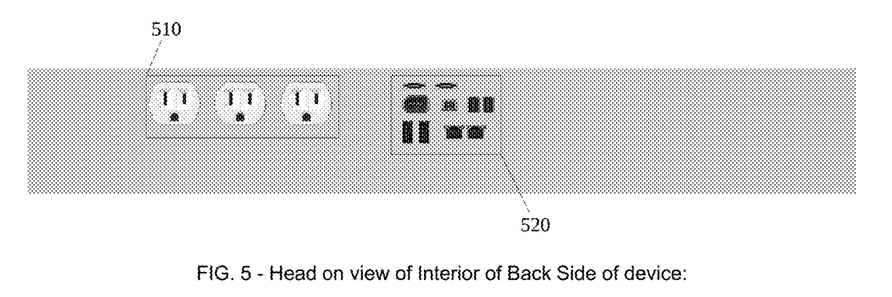
Figure 6:
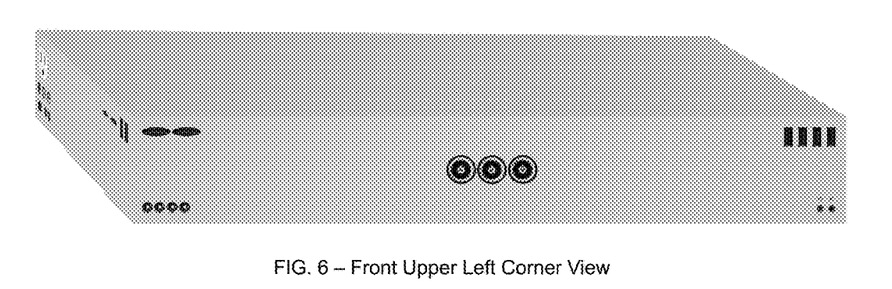
Figure 7:
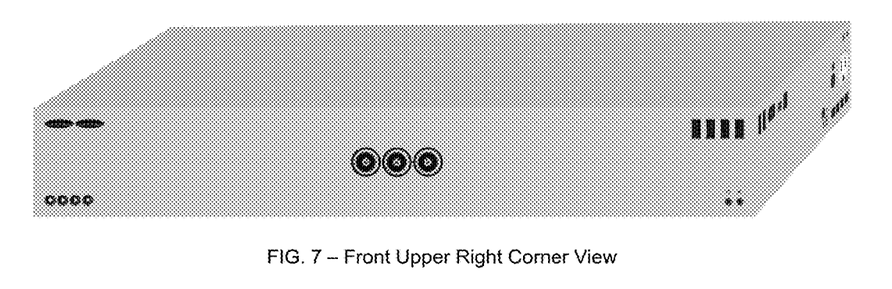
Figure 8:
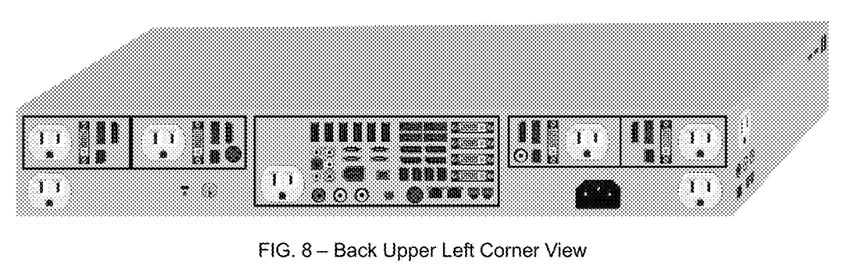
Figure 9:
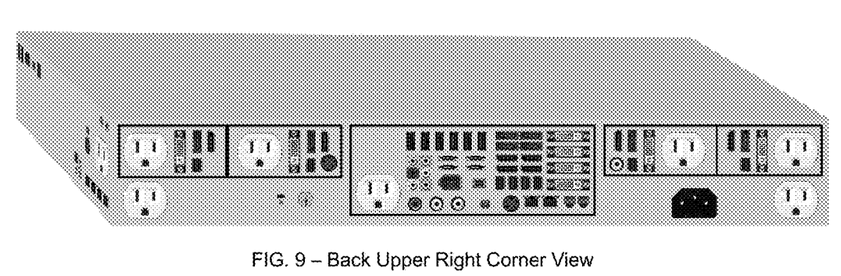
Figure 10:
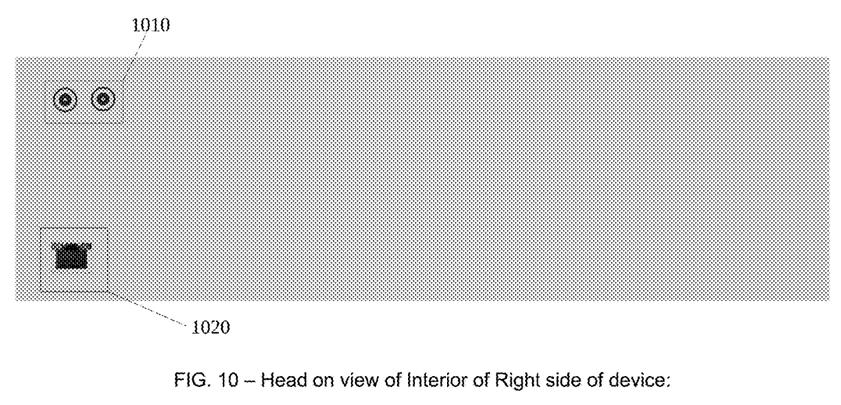
Figure 11:
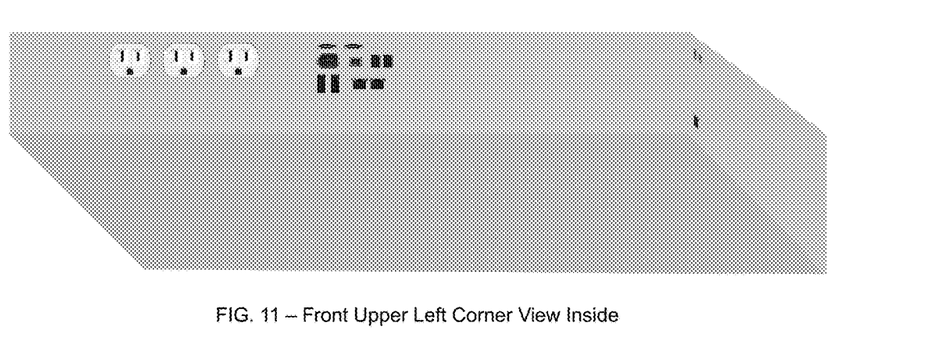
Figure 12:
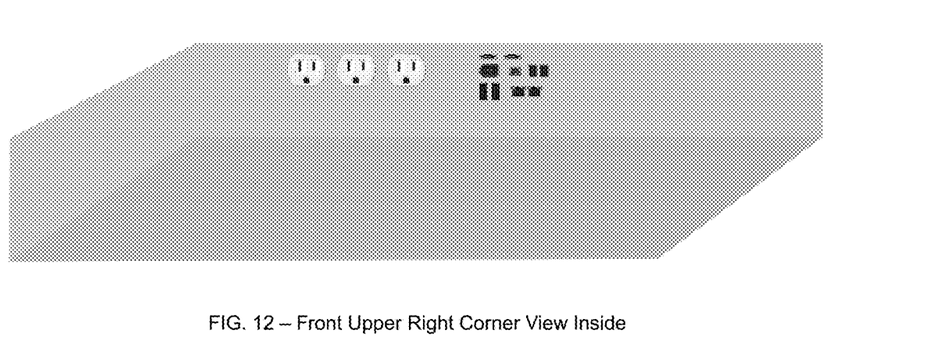
Figure 13:
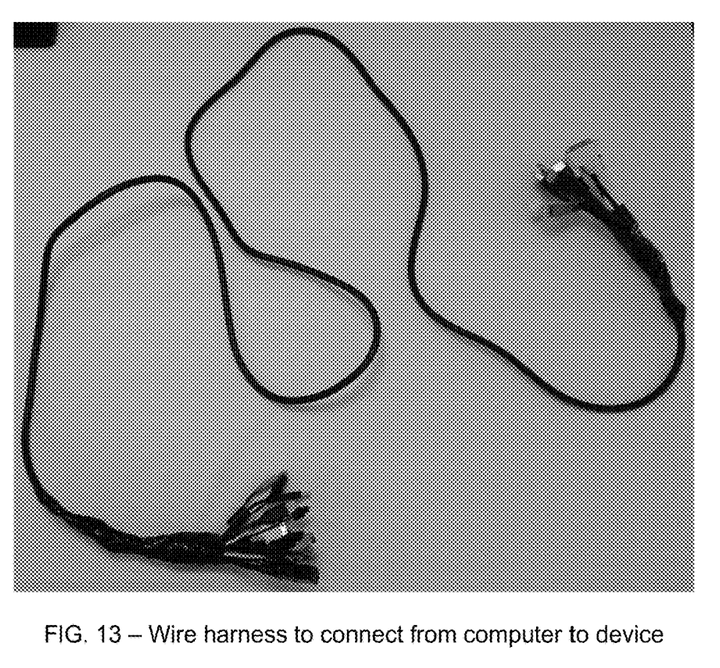
Figure 14:
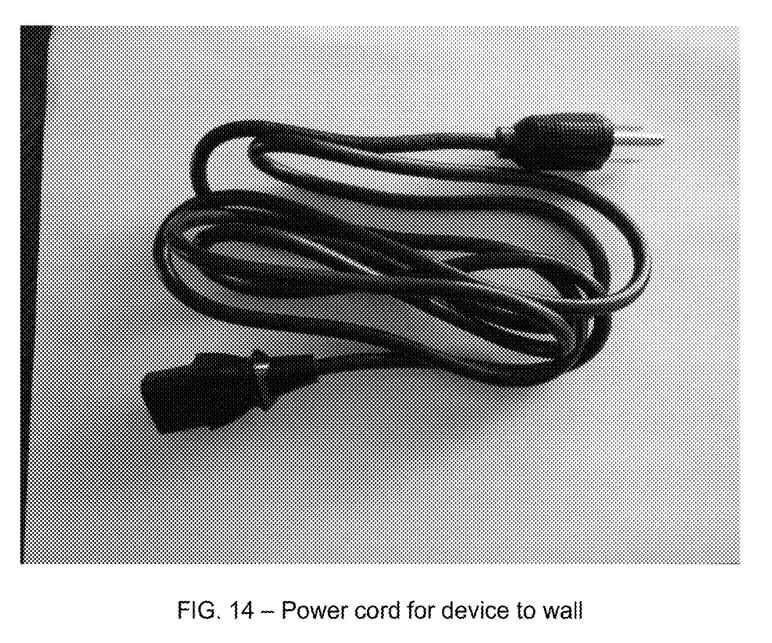
Figure 15:
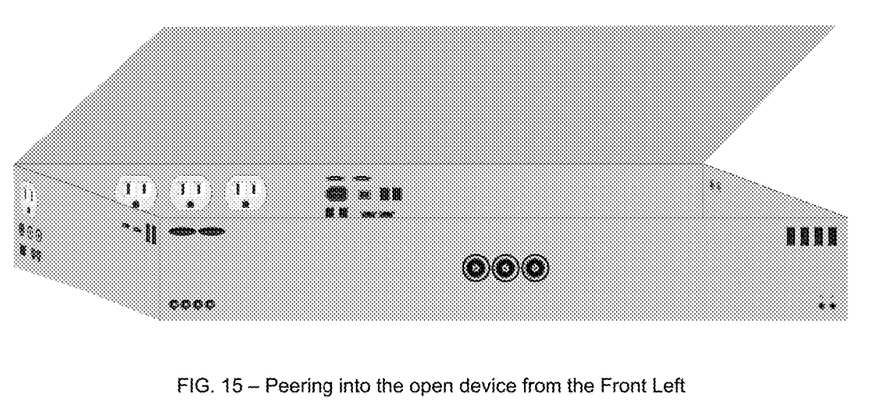

(FIG. 5, FIG. 10 and FIG. 11) show various ports/connectors on the inside of the device for more long term internal storage and access.

The invention claimed is:

1. A container device large enough and strong enough to place a monitor securely on top comprising all of the following;
    a cable harness to deliver power to the device and I/O connectors from a computer to the device,
    an internal Uninterruptible Power Supply (UPS), multiple internal surge protectors, multiple internal and external power ports, multiple power buttons, multiple computer accessory I/O ports, multiple I/O telephony ports, a router, a switch, multiple I/O network ports, heat dissipation vents, a lid to access the interior of the apparatus, and multiple locks.

2. The device of claim 1 further comprising;
    said cable harness for routing AC power from the wall to the device with multiple I/O connectors for bridging the power and I/O ports on the external computer to the power and I/O ports on the device.

3. The device of claim 1 further comprising;
    said power ports structured as follows;
        an AC input power port for power to the device from the wall to an internal power splitter; one splitter passes power to said UPS then to a surge protector which outputs power to the external power port for the external computer and external power ports for the monitors;
        another splitter passes power to a surge protector that outputs power to the power ports for accessories, utilities and appliances;
        one splitter passes power to a surge protector, which outputs power to the power ports for the network, cloud and storage as well as external power ports for charging external accessories.

4. The device of claim 1 further comprising;
    said multiple power buttons each controlling the power of part of the apparatus;
    a first power button controls output power from the first surge protector to the computer and monitors;
    a second power button controls output power from the second surge protector to said accessories, utilities and appliances;
    a third power button controls output power from the third surge protector to said network, cloud and storage as well as output power for charging said external devices.

5. The device of claim 1 further comprising;
    said accessories, utilities and appliances;
    said accessories comprising AC powered ports for computer accessories, I/O ports for jump drives, external hard drives, digital storage media, video equipment, sound equipment, pen readers, bar code scanners, Q Code scanners;
    said utilities comprising AC powered ports for lamps, calculators, 10 key machine, shredders, speakers, peripheral hubs; and
    said appliances comprising network appliances, printers and scanners.

6. The device of claim 1 further comprising;
said network, cloud and storage; said network comprising AC powered ports and I/O ports for the router, switch;
said cloud comprising AC powered ports, I/O ports for jump drives, external hard drives, digital storage media and antenna ports; and
said storage comprising AC powered ports, I/O ports for NAS storage drives.

7. The device of claim 1 further comprising said vents for heat dissipation and cooling.

8. The device of claim 1 further comprising said lid for accessing storage of storage drives and access to the router, the lid opens at the front and away from the user with a hinge at the back of the box.

9. The device of claim 1 further comprising a locking mechanism to secure the lid of the apparatus to the apparatus.

10. The device of claim 1 further comprising a second locking mechanism to secure the apparatus to the desktop.

* * * * *